United States Patent [19]
Wulf et al.

[11] Patent Number: 5,046,358
[45] Date of Patent: Sep. 10, 1991

[54] DEFORMABLE WALL

[75] Inventors: Rudolf Wulf, Göttingen; Burkhard Binder, Göttingen-Hetjershausen; Beatrix Hieronimus, Rosdorf-Mengershausen, all of Fed. Rep. of Germany

[73] Assignee: Deutsche Forschuhgsanstalt fur Luft-und Raumfahrt F.V., Fed. Rep. of Germany

[21] Appl. No.: 433,143

[22] Filed: Nov. 8, 1989

[30] Foreign Application Priority Data

Nov. 9, 1988 [DE] Fed. Rep. of Germany ....... 3837970

[51] Int. Cl.$^5$ .......................... G01M 9/00; B64B 3/46
[52] U.S. Cl. .................................... 73/147; 244/219; 244/75 R; 52/2.11
[58] Field of Search ................. 244/219, 75 R; 92/92, 92/89; 73/147; 901/21, 22; 294/119.3; 52/2 R

[56] References Cited

U.S. PATENT DOCUMENTS

| 3,118,639 | 1/1964 | Kiceniuk | 244/219 |
| 3,209,719 | 10/1965 | Christopher | 244/219 |
| 3,601,442 | 8/1971 | Orndorff, Jr. | 92/92 |
| 3,930,626 | 1/1976 | Crosswell, Jr. | 244/219 |
| 4,784,042 | 11/1988 | Paynter | 92/48 |

FOREIGN PATENT DOCUMENTS

| 396462 | 4/1909 | France | 244/219 |
| 1234874 | 2/1969 | United Kingdom . | |

*Primary Examiner*—Galen Barefoot
*Attorney, Agent, or Firm*—Thomas, Kerr & Kayden

[57] ABSTRACT

Deformable wall which is manufactured preferably from reinforced plastic includes least one closed cavity (2) and is arranged in the interior of the wall (1). A device (6) to change the cavity pressure is provided. The cavity pressure is decreased or increased to deform the wall (1).

10 Claims, 4 Drawing Sheets

DEFORMABLE WALL

BACKGROUND OF THE INVENTION

The invention starts from a deformable wall made of preferably reinforced plastic.

Deformable walls are required for various conditions of use. For example, deformable walls are applied in wind tunnel testing techniques, in which the wall of a wind tunnel must be deformed, i.e. adapted in such a way that it follows the airflow pattern produced by the model situated in the wind tunnel. This is desirable in order to reduce or to eliminate the interferences of the wall of the wind tunnel on the airstream past the model in the wind tunnel. Furthermore, it is possible with such a deformable wall to cancel out any compression impacts arising on the wall such that they do not in turn strike the model due to reflection. Consequently, this measure also serves for the prevention of wall interferences.

A further area of application of deformable walls is with airplane ailerons, of which the contour or parts of the contour are formed by the deformable wall. Thus it is possible at any time to change the contour of the airplane aileron by deforming the wall, such that the contour can be adapted to correspond to the respective prevailing conditions. This is called a variable curvature. By this means a considerable saving of fuel can be achieved. By deforming the wall, the leading edges of the ailerons can also be changed in such a way that so-called slats are produced for the take-off and landing phase. By this means, complicated adjustment mechanisms are spared and interruptions in the contour are avoided which must be particularly avoided in the development of a laminar aileron.

In the case of large, curved surfaces, for example with parabolic mirrors, such deformable walls are also advantageous since high precision cannot be maintained from the very beginning. By means of later deformation of the wall, which takes place after assemblage, the required precision can then be fulfilled.

A deformable wall of the type described at the beginning is known from the German journal for Aeronautics and Space Research 3 (1979), issue 2, pages 129 to 133. In the article by U. Ganzer "Windkanäle mit adaptiven Wänden zur Beseitigung von Wandinterferenzen" ["Wind tunnels with adaptive walls to eliminate wall interferences"], a deformable wall is described which is manufactured from glass fiber-reinforced plastic. A multitude of adjustment devices is provided which are connected to the wall via joints. This deformable wall is used as a wind tunnel wall in order that the airstream in the wind tunnel can be adapted to correspond to the airflow pattern caused by the wind tunnel model. As already described above, by this means wind tunnel interferences can be reduced or eliminated. It is disadvantageous that the size of the construction is relatively large. Due to this, the minimum distance possible between the individual adjustment devices is likewise relatively large, such that fine adjustment of the wall is not possible. In particular when compression impacts occur, this wall cannot cancel out the compression impacts on account of the relatively large distance between supports. It is furthermore disadvantageous that, due to the arrangement of the joints when the wall has been adjusted, a moment is exerted on account of the adjustment devices such that, finally, the adjusted wall exhibits undulations. However, this is undesirable since such undulations in turn affect the airflow past the model to be measured in the wind tunnel.

DE-AS-2,941,404 discloses a measurement section on wind tunnels which likewise has a deformable wall. This deformable wall is circular in cross-section and is manufactured preferably from rubber. In this case too, a multitude of adjustment devices, which are arranged on the circumference in a longitudinal direction, act on the wall and consequently bring about the possibility of deformability. Thus the principle of the deformation of the wall is the same as already described above with all its disadvantages such as limited distance between supports and thus finally also with only low precision of the wall adjustment.

SUMMARY OF THE INVENTION

The invention is based on the object of developing a deformable wall of the type described at the beginning in such a way that a specified deflection can be set with high precision.

According to the invention its object is achieved by the fact that at least one closed cavity is arranged in the interior of the wall, that a device is provided to change the cavity pressure, and that the cavity pressure is decreased or increased to deform the wall. Thus the present invention proposes a completely novel way of solving the problem. At least one closed cavity is provided in the interior of the wall. Connected to this closed cavity is a device that influences the cavity pressure. For example by increasing the cavity pressure, the wall curves outwards in the region of the cavity and thus receives a different contour, that is to say the wall is deformed. The size of the deflection, that is to say of the deformation of the wall, is dependent on the pressure which is produced in the cavity by the device. The relation between the cavity pressure and the deflection of the wall is easy to determine, for example using a corresponding calibration. If the cavity pressure is decreased again, the deformation is reverted, i.e. the wall assumes its original shape again. The cavity pressure can be determined very easily and accurately by simple measures, such that finally the wall deflection can be carried out very accurately. It is furthermore advantageous that the pressure can also be changed accordingly relatively quickly such that prolonged adjustment, as takes place in the prior art, is dispensed with here. The wall according to the invention is also set up easily and without mechanical parts such that it is highly reliable in operation. On account of the simple construction, the deformable wall can also be manufactured relatively inexpensively which considerably increases its area of application. A further important advantage is seen in the fact that the deformable wall can also be used at cryogenic temperatures, such as can arise with today's modern wind tunnels. Even under these extreme conditions, no operating faults are to be expected.

The wall can have a multitude of cavities with different longitudinal and transverse extents, the cavities being arranged, on the one hand, in the direction of the longitudinal extent of the wall and, on the other hand, in the direction of the transverse extent, such that transverse and longitudinal webs are formed between the individual cavities, in which arrangement the cavities, which are adjacent in transverse direction, can be arranged to be mutually offset. Thus an arrangement of not just one cavity, but a multitude of cavities is envisaged. The cavities can be constructed in different ways, such that they can be adapted to the respective conditions of use of the wall. It is also possible to provide a multitude of cavities above and below one another in transverse direction of the wall and adjacent to one another in longitudinal direction. The transverse and longitudinal webs are then formed between the individual cavities. The individual cavities now influence one another via the transverse and longitudinal webs such that finally, by means of different cavity pressures in the individual cavities, a desired contour of the deformable wall can be set with high precision. The cross-sectional form of the individual cavities as well as their size is designed primarily according to the required adjustment path and the required precision. The same applies to the number of individual cavities to be provided. If, for example, a relatively large adjustment path is to be implemented, a multitude of cavities, in particular in transverse direction, is required. In order to achieve a high precision, as many cavities as possible must be provided in longitudinal direction. Since these cavities can also be of almost any desired small shape, the number of cavities can be increased correspondingly.

In the direction of the depth, the cavities can be constructed to be continuous or divided, and a duct to the surface of the wall can be provided in the case of cavities of divided construction. In particular with a two-dimensional wall, the cavities are mostly of continuous construction. The device to change the cavity pressures is then connected to the one opening of the respective cavities while the other opening of the respective cavity is sealed. If the cavities are of two-part construction, a connection means for the device to change the cavity pressure can be attached on both sides of the wall. With cavities of a construction divided into more than two parts, the duct to the surface of the wall is provided as a connection.

Selected transverse and/or longitudinal webs or parts thereof made of highly flexible material can be provided. This has the advantage that, with a deformation of the wall causing a change in length, compensation in length can be achieved on account of the highly flexible material. Stresses in the wall or even undulations on account of the change in length can consequently be effectively prevented due to the deformation.

A separate device to change the cavity pressure can be provided for each cavity. However it is likewise possible to combine the cavities to form cavity groups and to provide a device to change the cavity pressure for each cavity group, and to arrange a scanning device between the individual devices to change the cavity pressure and the allocated cavity groups. On the one hand it is consequently possible to provide each cavity separately with its own device to change the cavity pressure and consequently to carry out the setting of the wall in a very short time. If a very fast adjustment or deformation of the wall is not required, the devices to change the cavity pressure or the cavity pressures can be reduced to one single device. Between the device and the cavity groups, a scanning device is then provided which connects the device to change the cavity pressure to the individual cavities such that each specific individual cavity can be activated.

The device to change the cavity pressure can be constructed in such a way that it introduces gas or liquid into the cavities. Besides these two substances, that is to say besides gas or liquid, other substances are also conceivable; it is only important that these substances effect a change in volume of the cavities. However, the use of gas is particularly advantageous since, with gas, a partial vacuum can also be produced in the cavities and thus a negative deflection of the deformable wall is possible.

The one side of the wall can be of rigid construction. By this means the effectiveness of the deformable wall is considerably increased. This can be explained by the fact that, with walls of soft construction on both sides, the deformation is also effective on both sides, that is to say in each case approximately half the deformation caused by the deformation of the cavities. However mostly it is only necessary to deform one side of the wall. If only the one side of the wall is of rigid construction, not just half but the entire deformation of the individual cavities takes place in the direction of the side of the wall which is not of rigid construction. By this means a larger adjustment path is achieved.

On the rigidly constructed side of the wall, adjustment devices, preferably servomotors, can be provided. The servomotors then serve for the approximate setting of the wall, while the change of the cavity pressures or the increase or decrease in the cavities causes a fine setting of the wall. In this case the distance of the cavities in the longitudinal extent of the wall can be smaller than that of the adjustment devices.

BRIEF DESCRIPTION OF THE DRAWINGS

The invention is described further with reference to preferred exemplary embodiments.

DETAILED DESCRIPTION

Figure 1:
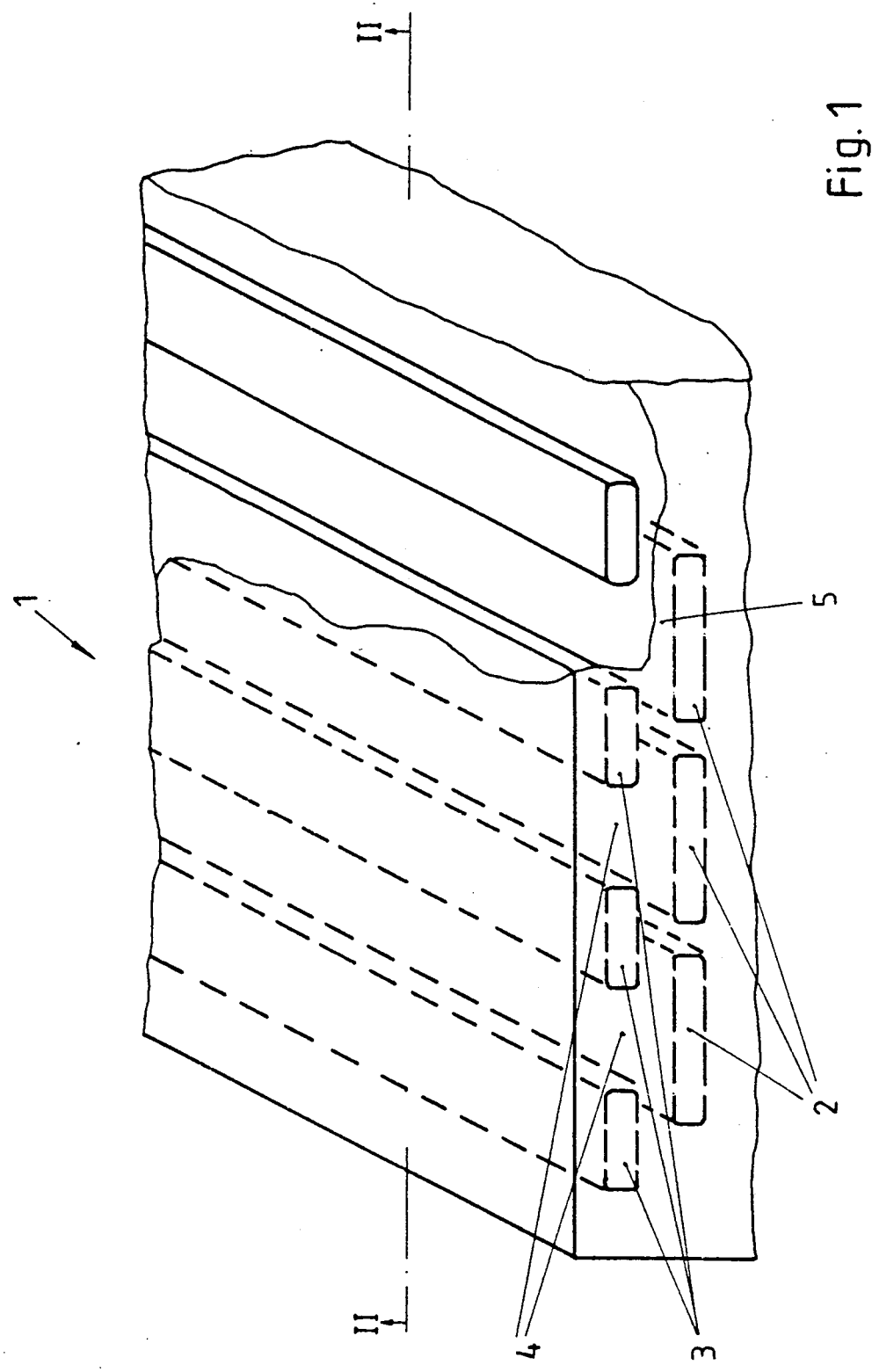
FIG. 1 shows a schematic three-dimensional representation of a deformable wall.
Figure 2:
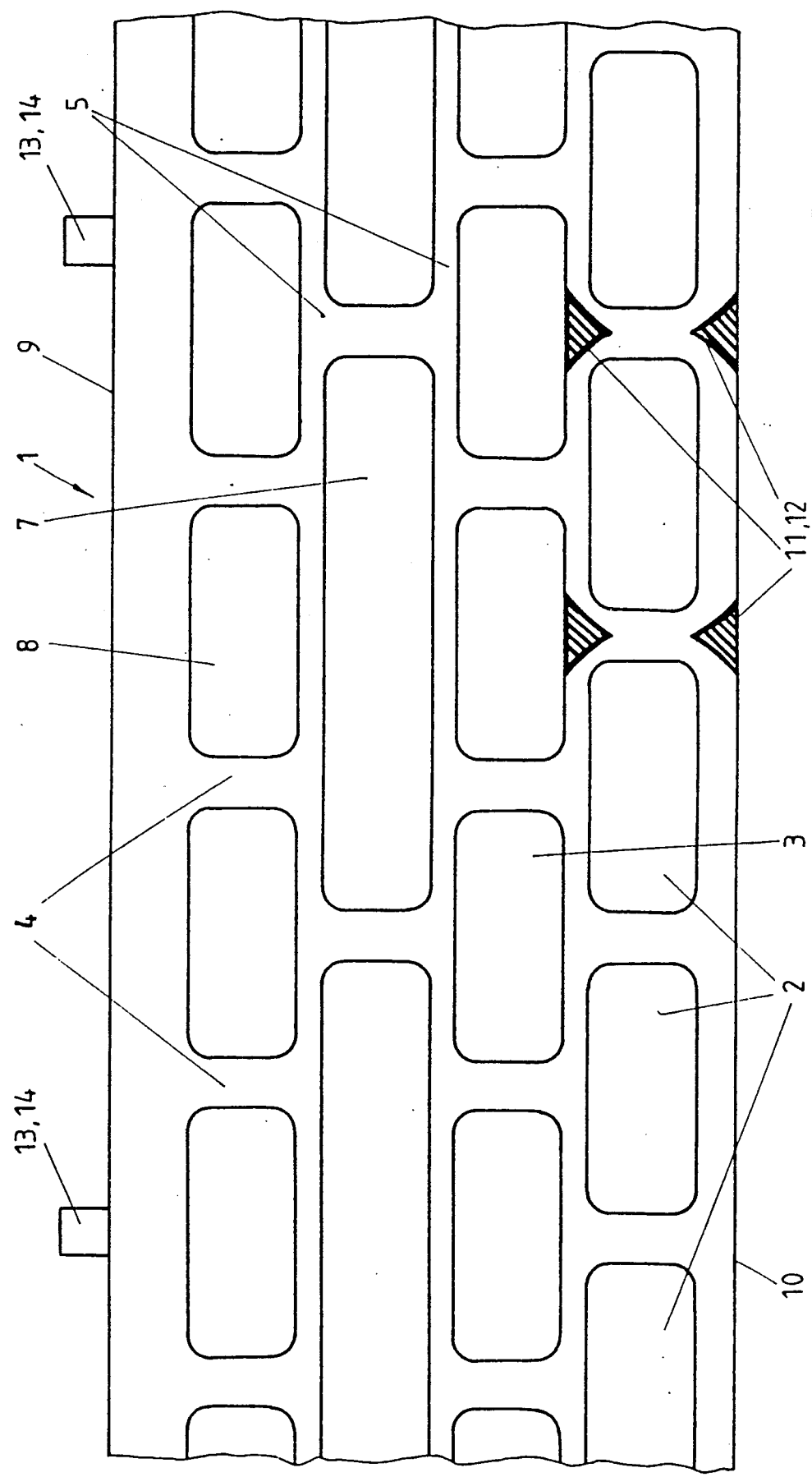
FIG. 2 shows a section according to II—II in FIG. 1.

The strongly schematic view of FIG. 1 shows a deformable wall 1 which has a multitude of cavities 2 and 3. Transverse webs 4 and longitudinal webs 5 are formed between the cavities 2 and 3. The cavities 2 and 3 have an approximately rectangular cross-section, but they can also have any other cross-section. The extent of the cavities 2 and 3 in terms of depth is continuous, i.e. in the direction of the depth the cavities 2, 3 are provided to be continuous. Devices to change the cavity pressure 6 are connected to the cavities 2, 3 (see FIGS. 3, 4 and 5). A possible variant of the arrangement of the cavities 2, 3 can be particularly clearly seen from FIG. 2. In this figure further cavities 7 and 8 are provided next to the cavities 2 and 3. The one side 9 of the wall 1 is of relatively rigid construction, i.e. the direction of the fiber of the reinforced plastic has been selected in such a way that a relatively high strength results while, on the other side 10, zones 11 are provided which consist of highly flexible material 12. To implement large adjustment paths or large deflections of the wall 1, adjustment devices 13, which preferably have servo motors 14, are arranged on the side 9 of rigid construction.

The manner of functioning is now to be explained in more detail below. Initially, the wall could be a smooth wall 1 or also a wall 1 which has already been deformed. Starting from the present contour of the wall 1, a new contour is to be set, i.e. the side 10 of the wall 1 is to have a certain specified contour after setting. For the approximate setting, the adjustment devices 13, as is already known in the prior art, are firstly adjusted accordingly. However, the wall 1 which has now been set still has certain undulations, that is to say the specified contour is only reflected very inaccurately. In order to avoid or to compensate for these inaccuracies, corresponding cavity pressures are produced with the aid of the device to change the cavity pressure in the cavities 2, 3, 7, 8. For this purpose, preferably gas or liquid is introduced into the cavities 2, 3, 7, 8 or withdrawn from them. If, for example, gas is introduced in one or more of the cavities 8, that is to say the cavity pressure is increased, these cavities 8 expand, i.e. they become deformed on account of the greater cavity pressure. This deformation is transmitted via the transverse webs 4 and longitudinal webs 5 to the cavities 2, 3, 7 situated below, i.e. in the direction of the wall 10. In this case, it is important that the gas introduced into the cavities 2, 3, 7, 8 is largely incompressible, i.e. that the cavities do indeed become deformed. Due to this first deformation, a high accuracy of the desired wall contour is already achieved. A further increase in accuracy is achieved by changing the cavity pressure of the cavities 2, 3, 7. The cavity 2 is mainly to maintain the same pressure as the external pressure along the side 10. Overpressure or a partial vacuum in the cavity 2 relative to the external pressure on the side 10 of the wall 1 is only required to achieve the maxima or minima in the contouring of the side 10. Due to the number of cavities being freely selectable within a wide range, it is possible to increase the accuracy of the contour of the wall 1 to almost any degree. The stresses arising during the deformation of the wall 1, in particular in the region of the side 10, are compensated by the zones 11 with the highly flexible material 12. In this way, undulations which would otherwise arise are reliably avoided.

Figure 3:
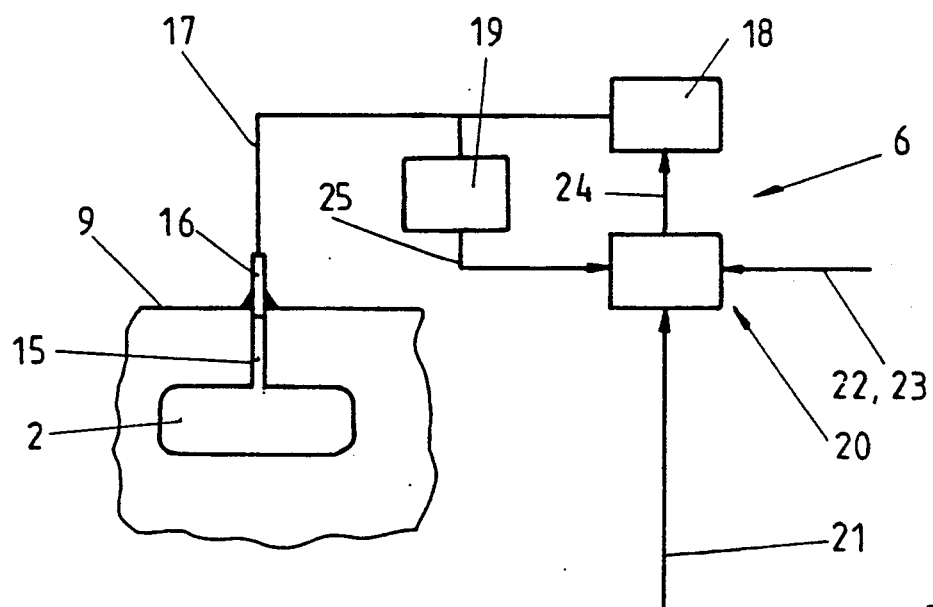
FIG. 3 shows a schematic representation of a regulating unit for the deformable wall.

FIG. 3 shows one possibility of changing the cavity pressure. The cavity 2 is connected to the side 9 of the wall 1 by a duct 15. In the duct 15, a small tube 16 is bonded in, which is connected via a hose 17 to the device to change the cavity pressure 6. The device to change the cavity pressure has a pressure source 18, a pressure measuring instrument 19 and a regulating unit 20. A corresponding signal is passed via a lead 21 to the regulating unit 20 by pickups (not shown in detail) to determine the actual contour of the wall 1. This actual signal is compared with a nominal signal 24 which is in contact with the regulating unit 20 via the lead 23. If the signals do not coincide, a corresponding signal is applied via a lead 24 to the pressure source 18 which then effects a change in the cavity pressure of the cavity 2 via the hose 17. Instead of the actual contour of the wall 1, it is also possible to determine the actual pressure along the side 10 of the wall 1. With the aid of known calculating procedures, the required wall deformations and thus also the required cavity pressures can be calculated for the wind tunnel from the pressures along the side 10 of the wall 1. This change in the cavity pressure can be both an increase in pressure and a reduction in pressure. The cavity pressure is measured by the pressure measuring instrument 19 and likewise passed to the regulating unit 20 via the connection 25. It is to be understood that not only the cavity pressure of the cavity 2 is changed in the manner described above, but that all cavities 2, 3, 7, 8 have a corresponding connection. In this case, not every one of the cavities 2, 3, 7, 8 necessarily has to have a separate device to change the cavity pressure 6, but it is also possible that a scanning device 26, (see FIG. 4) is arranged between the individual cavities 2, 3, 7, 8 and one or more devices to change the cavity pressure 6. Furthermore a regulating unit 20 does not necessarily always have to be provided. It is quite conceivable that only one control device is provided.

Figure 4:
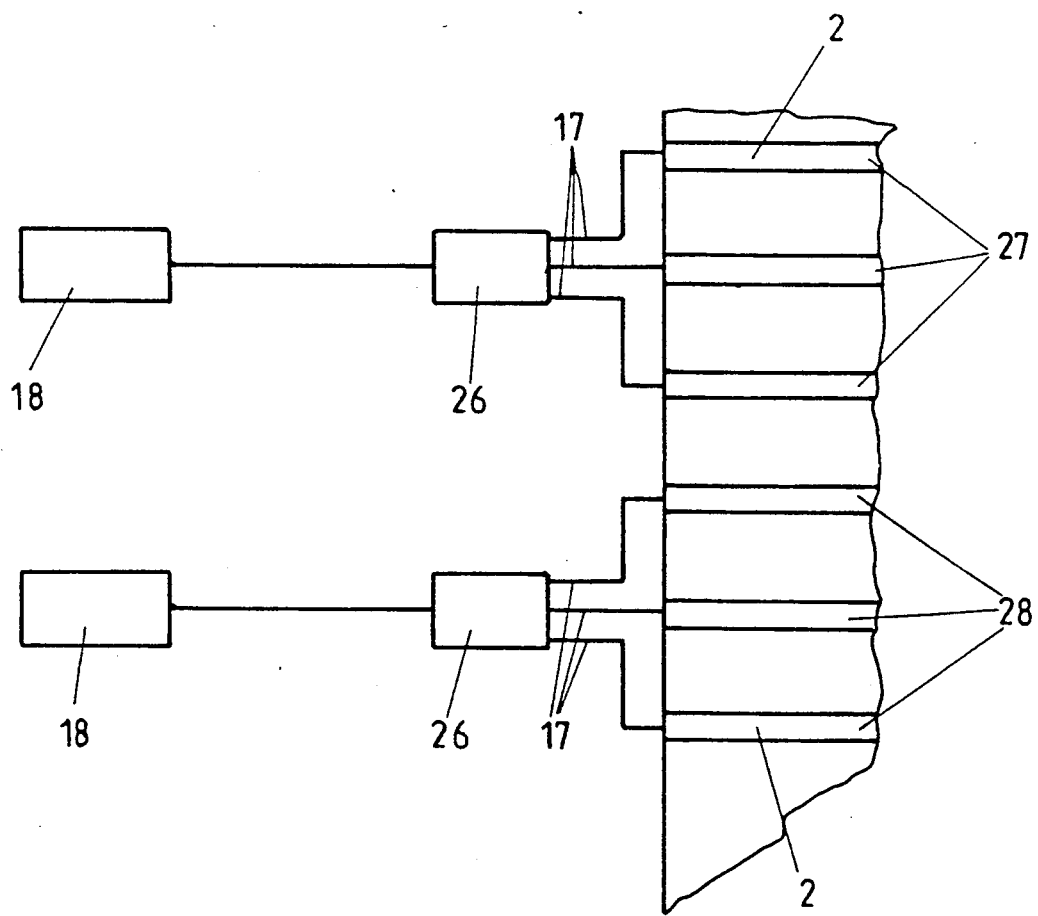
FIG. 4 shows a connection means of a device to change the cavity pressures and FIG. 5 shows a further possibility of arranging the device to change the cavity pressures.
Figure 5:
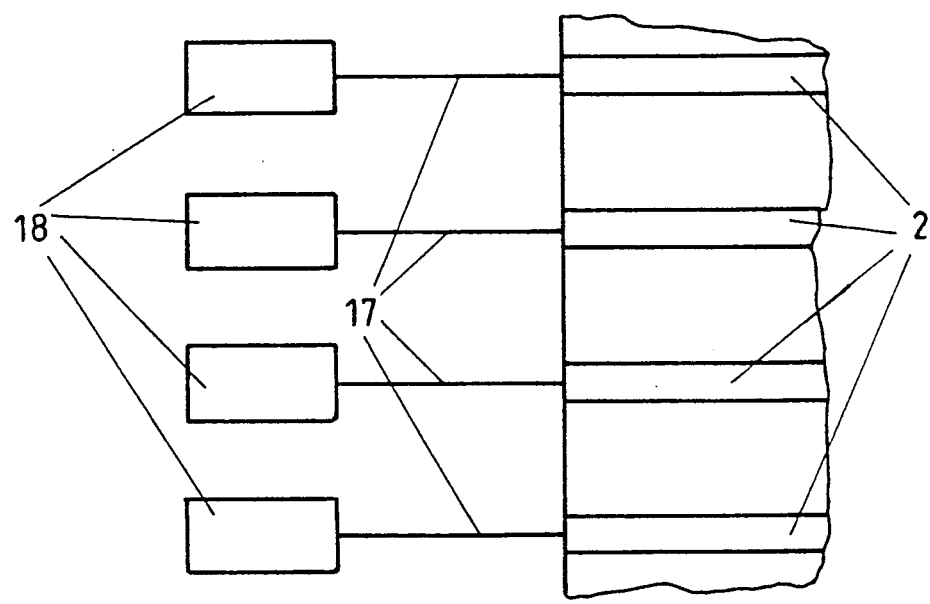

In FIG. 4, the cavities 2 are combined to form cavity groups 27 and 28. In the case shown here, each cavity group 27, 28 consists of three cavities 2. It is, of course, also possible to allocate more or fewer cavities 2 to the cavity group 27 or 28. Each of the cavities 2 of the cavity group 27 is connected via the hose 17 to the scanning device 26. The scanning device is connected to the pressure source 18. The scanning device 26 now connects the individual cavities 2 of the cavity group 27 successively to the pressure source 18. That is to say the cavity pressure of the cavities 2 of the cavity group 27 is successively changed. This has the advantage that only a low number of pressure sources 18 is required. However it is disadvantageous in this case that the change in the cavity pressure takes place sequentially and consequently the adjustment of the wall 1 requires more time. The change in the cavity pressure of the cavities 2 of the cavity group 28 takes place correspondingly. However, it is, of course, also possible, as shown in FIG. 5, to allocate each cavity 2 with its own pressure source 18. The adjustment of the wall 1 can then take place in a very short time.

List of Reference Numerals:

1 = wall
2 = cavity
3 = cavity
4 = transverse webs
5 = longitudinal webs
6 = device to change the cavity pressure
7 = cavity
8 = cavity
9 = side
10 = side
11 = zone
12 = highly flexible material
13 = adjustment device
14 = servomotors
15 = duct
16 = small tube
17 = hose
18 = pressure source
19 = pressure measuring instrument
20 = regulating unit
21 = lead
22 = nominal signal
23 = lead
24 = lead
25 = connection
26 = scanning device
27 = cavity group
28 = cavity group It will be obvious to those skilled in the art that various changes and modifications can be made to the embodiments of the invention as disclosed herein without departing from the spirit and scope of the invention as set forth in the following claims.

We claim:

1. A deformable wall including a first surface of relatively rigid construction and a second surface of relatively flexible construction, a series of elongated parallel cavities formed within the wall in rows, with the rows of cavities arranged in a plurality of layers of rows between said first and second surfaces and with the cavities of one row offset from the cavities of an adjacent row, inflation means for inflating and deflating said cavities with fluid so as to change the shape of said cavities and thus change the shape of said second surface of the wall, said inflation means comprising means to impart different fluid pressures to different ones of said cavities.

2. The deformable wall of claim 1 and further including transverse webs extending from alternate rows of cavities between cavities of intermediate rows whereby when a cavity of one row is changed in size the transverse web extending from the changed cavity transmits movement to a cavity in the alternate row of cavities.

3. A deformable wall for use in a wind tunnel adjacent the flow path of a fluid stream, comprising:
- a rigid wall surface;
- a deformable wall surface spaced apart from said rigid wall surface and positioned adjacent the flow path of the fluid stream;
- a first series of elongated parallel cavities formed in a row between said wall surfaces;
- at least one second series of elongated parallel cavities formed in a row between said wall surfaces adjacent the row of said first series of cavities;
- said first and second series of cavities having different longitudinal and transverse extents and being arranged with said first and second series of cavities mutually offset from and overlying one another; and
- means for increasing and decreasing the pressure in selective ones of said cavities so as to locally deform said deformable wall surface relative to said rigid wall surface.

4. The deformable wall of claim 3 and further including a plurality of longitudinal webs extending between said parallel to said first and second series of cavities, and a plurality of transverse webs positioned between said cavities of each of said first and second series of cavities.

5. The deformable wall of claim 3 and further including webs extending between adjacent cavities of one row and intersecting the cavities of an adjacent row of cavities.

6. The deformable wall of claim 3 and further including a fluid supply duct communicating with each of said cavities for introducing fluid into each of said cavities to thereby change the pressure within each of said cavities.

7. The deformable wall of claim 4 and wherein said transverse longitudinal webs are constructed from a flexible material.

8. The deformable wall of claim 3, and wherein each of said cavities is connected to a separate means for increasing and decreasing the pressure within said cavity such that the pressure within each of said cavities can be increased and decreased independently of each of said other cavities.

9. The deformable wall of claim 3, and wherein said cavities are arranged in cavity groups with a separate means for increasing and decreasing the pressure in said cavities provided for each of said cavity groups, and further including a scanning device arranged between each of said means for increasing and decreasing the pressure in said cavities for each of said cavity groups.

10. The deformable wall of claim 8 and wherein said means for increasing and decreasing the pressure in said cavities comprises means for introducing and withdrawing fluid from each of said cavities to vary the pressure within each of said cavities, and further includes a regulating unit for controlling the change in pressure in said cavities.

* * * * *